(No Model.)
J. G. HALLAS.
HOSE SLEEVE.
No. 511,138. Patented Dec. 19, 1893.
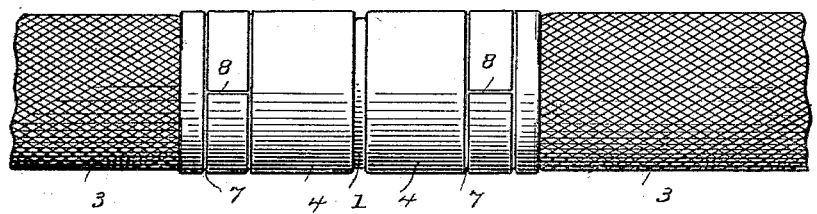
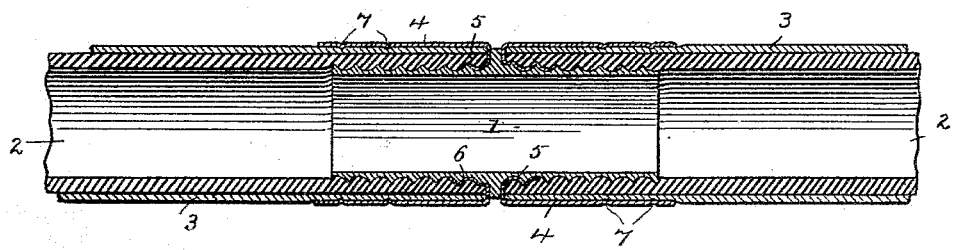
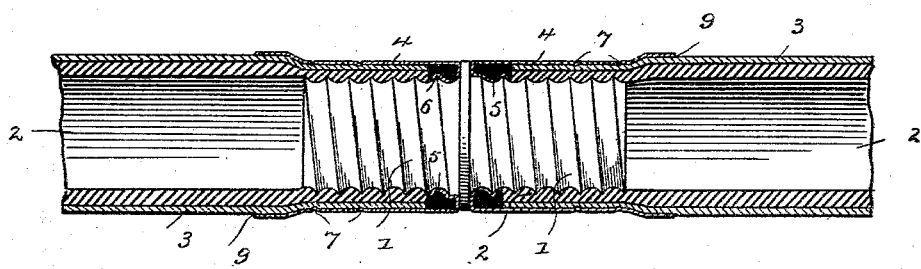
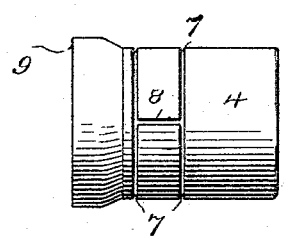
WITNESSES
H. A. Lamb
Pearl Reynolds
INVENTOR
James G. Hallas
By A. M. Wooster
Atty

UNITED STATES PATENT OFFICE.

JAMES G. HALLAS, OF WATERBURY, CONNECTICUT.

HOSE-SLEEVE.

SPECIFICATION forming part of Letters Patent No. 511,138, dated December 19, 1893.

Application filed April 24, 1893. Serial No. 471,722. (No model.)

*To all whom it may concern:*

Be it known that I, JAMES G. HALLAS, a citizen of the United States, residing at Waterbury, in the county of New Haven and State of Connecticut, have invented certain new and useful Improvements in Hose-Sleeves; and I do hereby declare the following to be a full, clear, and exact description of the invention, such as will enable others skilled in the art to which it appertains to make and use the same.

My invention relates to the class of coupling sleeves described and claimed in my former Patent No. 454,648, dated June 23, 1891, and has for its object to provide coupling sleeves of this class which will act to contract hose of over size so that it will engage a coupling of regular or standard size, and which shall also be provided with longitudinal and circumferential ribs upon the inner side formed by striking in the metal, whereby when the sleeve has once been placed in position upon the hose it cannot be turned thereon when the threaded portion of a coupling or union is inserted.

With these ends in view I have devised the novel sleeve which I will now describe referring by numbers to the accompanying drawings forming part of this specification in which—

Figure 1 is an elevation of one of my novel sleeves detached; Fig. 2 a sectional view illustrating the application of my improved sleeves to two ends of hose of over size which are shown as connected by an ordinary union the union appearing in elevation, and Fig. 3 is an elevation, and Fig. 4 a sectional view illustrating the application of my novel sleeves to hose of regular size the ends of which do not require contracting in order to receive the couplings.

1 denotes a hose union of ordinary construction which illustrates the use of my invention it being understood of course that the use is the same with a coupling member as with a union.

2 denotes the rubber lining of hose, and 3 the textile covering or sheath therefor.

It is of course well understood by those familiar with this class of goods that the sizes of different makes of hose vary to such an extent as to make it extremely difficult to match all the different sizes of hose with regular sizes of couplings and sleeves.

4 denotes the body of my novel sleeve the metal of which is turned inward at its inner end to form an inner sleeve 5 which is provided with a screw thread 6 adapted to be engaged by the thread of a union or coupling. In order to adapt my novel sleeves for use upon hose having external and internal diameters greater than the diameters of regular hose and of course too great to receive couplings or unions of regular size, I provide the inner ends of the sleeves with enlarged funnel shaped receivers 9. When the sleeves are made in this manner the bodies are of standard size and the funnel shaped receivers act to contact the ends of irregular sizes of hose, sufficiently so that they may be forced into the sleeves said ends being then of a proper size to receive a coupling or union. As there is a tendency for the sleeve to turn on the hose when screw thread 6 is engaged by the thread of a coupling or union I provide circular ribs 7 and longitudinal ribs 8 on the inner side of the body. These ribs are formed by striking in the metal of the body in the process of manufacture. The ribs do not interfere to any appreciable extent with the placing of the sleeve upon the end of hose, but as the hose is expanded by the turning into it of the thread of a coupling or union the textile covering or sheath of the hose is expanded outward and is forcibly engaged by the circular and longitudinal ribs so that it is rendered practically impossible to turn the sleeve upon the hose.

Having thus described my invention, I claim—

1. A hose sleeve consisting of a body having at its outer end a threaded internal sleeve said body being provided with longitudinal and circumferential ribs which when the hose is expanded outwardly by a coupling or union forcibly engage the exterior of the hose thereby preventing the sleeve from turning thereon when the coupling or union is screwed in.

2. A hose sleeve consisting of a body having at its outer end a threaded internal sleeve, said body being provided with longitudinal and circumferential ribs which act to hold the sleeve against turning and at its inner end with a funnel shaped receiver 9 which acts to contract hose when it is forced into the sleeve.

In testimony whereof I affix my signature in presence of two witnesses.

JAMES G. HALLAS.

Witnesses:
ROSWELL H. BUCK,
GEO. C. NUTTALL.